(12) United States Patent
Schmidt

(10) Patent No.: US 11,986,713 B2
(45) Date of Patent: May 21, 2024

(54) INTERACTIVE FLOOR AND AMUSEMENT SYSTEMS AND METHODS EMPLOYING SAME

(71) Applicant: Activate Games inc., Winnipeg (CA)

(72) Inventor: Adam Schmidt, Winnipeg (CA)

(73) Assignee: Activate Games Inc., Winnipeg (CA)

( * ) Notice: Subject to any disclaimer, the term of this patent is extended or adjusted under 35 U.S.C. 154(b) by 30 days.

(21) Appl. No.: 17/898,821

(22) Filed: Aug. 30, 2022

(65) Prior Publication Data

US 2023/0118713 A1    Apr. 20, 2023

Related U.S. Application Data

(63) Continuation of application No. 17/148,989, filed on Jan. 14, 2021, now Pat. No. 11,511,171.

(30) Foreign Application Priority Data

Jan. 20, 2020    (CA) ................................ CA 3068840

(51) Int. Cl.
*A63B 67/00*    (2006.01)
*A63B 71/06*    (2006.01)
(Continued)

(52) U.S. Cl.
CPC .......... *A63B 67/00* (2013.01); *A63B 71/0669* (2013.01); *E04B 5/46* (2013.01);
(Continued)

(58) Field of Classification Search
CPC ...... F41J 13/00; C04B 40/0039; C04B 28/04; C04B 2201/20; C04B 2103/304; C04B 2111/2046; Y02W 30/96
See application file for complete search history.

(56) References Cited

U.S. PATENT DOCUMENTS

| 5,393,074 A | 2/1995 | Bear et al. |
| 10,653,938 B1 * | 5/2020 | Traustason ............. A63B 63/00 |

(Continued)

FOREIGN PATENT DOCUMENTS

| AU | 2015406125 A1 * | 4/2017 | ............. A63B 69/00 |
| CN | 201042620 | 4/2008 | |

(Continued)

*Primary Examiner* — Jeffrey S Vanderveen
(74) *Attorney, Agent, or Firm* — Kyle R Satterthwaite; Ryan W Dupuis; Ade & Company Inc.

(57) ABSTRACT

An amusement system features an interactive floor with an array of panels laid out in one or more grids to collectively define an interactive floor surface, an illumination system operable to individually illuminate each panel, and a sensing system operable to detect presence of any participant atop any panel. A base frame of the interactive floor is composed of a plurality of base modules seated on a subfloor, and supporting a respective panel for one or more cells of the interactive floor. The base modules are not directly fastened together, and instead are only intercoupled by perimeter seals applied over peripheral regions of the panels of neighbouring modules. Separation of the modules is constrained by surrounding walls of a room fully occupied by the interactive floor. In gameplay, some panels are distinctively illuminated as hazards to be avoided by participants, subject to penalty.

20 Claims, 8 Drawing Sheets

(51) Int. Cl.
  *E04B 5/46*   (2006.01)
  *E04F 15/02*  (2006.01)
  *E04H 3/10*   (2006.01)

(52) U.S. Cl.
  CPC ......... *E04F 15/02194* (2013.01); *E04H 3/10* (2013.01); *A63B 2071/0694* (2013.01); *A63B 2220/801* (2013.01); *A63B 2225/74* (2020.08)

(56) References Cited

U.S. PATENT DOCUMENTS

| | | |
|---|---|---|
| 2003/0218537 A1 | 11/2003 | Hoch et al. |
| 2010/0052253 A1 | 3/2010 | Macura et al. |
| 2010/0295483 A1 | 11/2010 | Ashoff et al. |
| 2018/0021677 A1 | 1/2018 | McClard et al. |
| 2019/0022520 A1 | 1/2019 | Leeming et al. |
| 2022/0186504 A1* | 6/2022 | Hurson ................. E04F 15/107 |

FOREIGN PATENT DOCUMENTS

| | | | |
|---|---|---|---|
| CN | 201042620 Y | * 4/2008 | |
| CN | 108352695 A | * 7/2018 | ........ E04F 15/02405 |

* cited by examiner

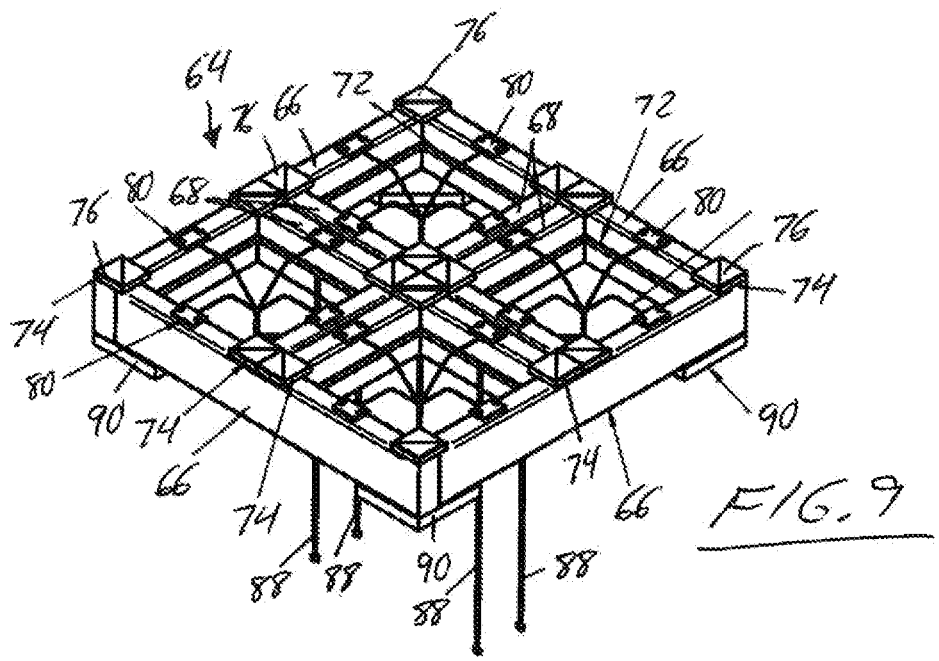
FIG. 9
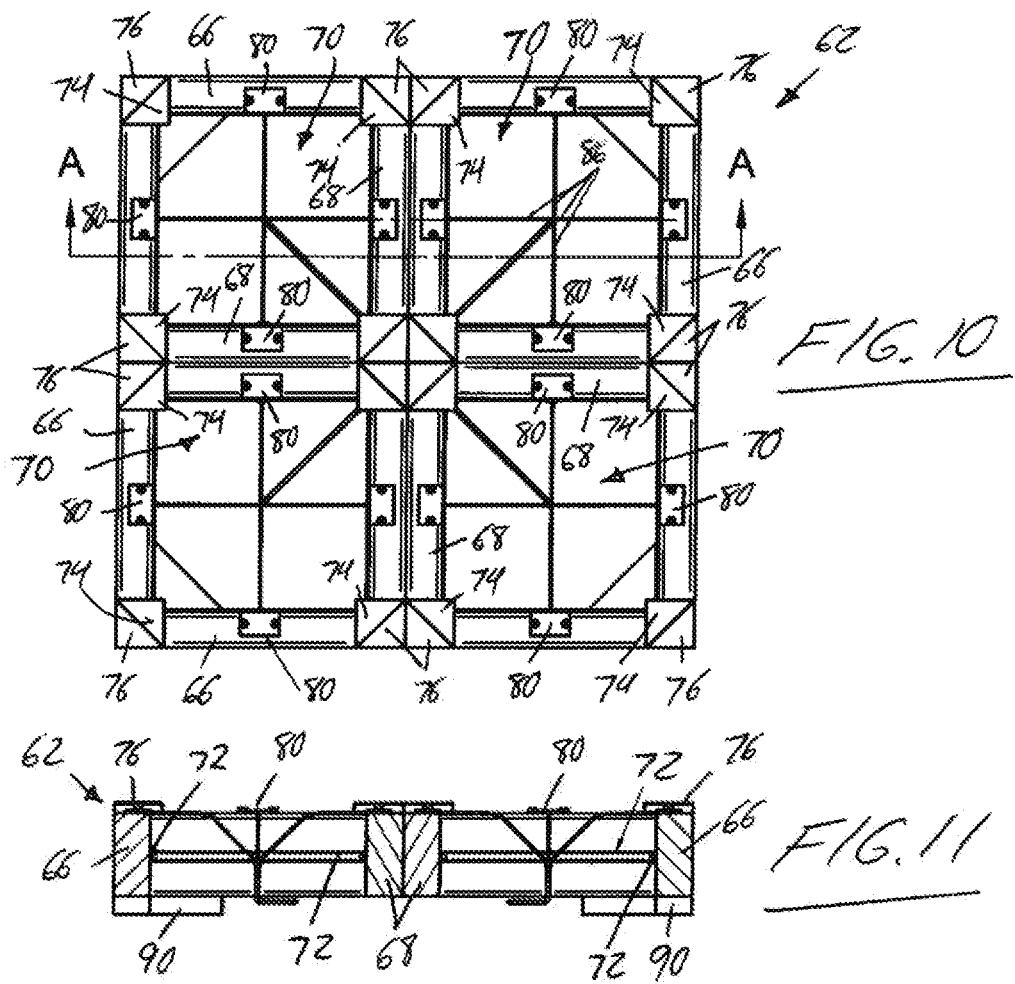
FIG. 10
FIG. 11

INTERACTIVE FLOOR AND AMUSEMENT SYSTEMS AND METHODS EMPLOYING SAME

CROSS-REFERENCE TO RELATED APPLICATIONS

This application is a continuation of prior Nonprovisional application Ser. No. 17/148,989, filed Jan. 14, 2021, which claimed foreign priority benefit under 35 USC 119(a) of Canadian Patent Application 3,068,840, filed Jan. 20, 2020, both of which are incorporated herein by reference in their entirety.

FIELD OF THE INVENTION

The present invention relates generally to amusement attractions, and more particularly to amusement attractions in which participants interact with illuminable weight-responsive cells of an interactive floor system as part of an immersive live-action gaming experience.

BACKGROUND

In recent years, escape rooms have become a popular form of immersive, live-action amusement attraction, providing an alternative to more conventional indoor amusement attractions such as laser tag, and to large scale amusement parks that are cost prohibitive, particularly in smaller markets and/or those where outdoor parks are subject to seasonal constraints in climates of notable temperature variation.

This demonstrates a yearning by the public for a greater variety of immersive amusement attractions and experiences, in response to which Applicant has developed a number of such immersive amusement attractions, which are the subjects of this and other concurrently filed patent applications.

The present application focuses on an immersive amusement attraction employing a novel interactive floor environment and related gameplay methodologies.

SUMMARY OF THE INVENTION

According to a first aspect of the invention, there is provided an amusement system comprising:
  an interactive floor system comprising:
    an array of panels laid out in one or more grids with the panels of each grid lying at generally equal elevation in generally coplanar relation to one another to collectively define respective areas of an interactive floor surface;
    an illumination system operable to individually illuminate each panel of the array independently of any other panel of the array; and
    a sensing system operable to detect presence of any participant atop any panel of the array, independently of whether presence of a participant is detected on any other panel in the array;
  a controller connected to the illumination and sensing systems and configured to send illumination command signals to the illumination system to change illuminated statuses of the panels of the array, and to receive detection signals from the sensing system denoting detected presence of participants on the panels of the array;
  wherein the controller is configured to execute a gameplay sequence, and to execute the following steps therein:
    designate a subset of the panels as hazard panels to be avoided by participants;
    trigger illumination of the hazard panels by the illumination system in a manner distinguishable from all other panels of the array;
    monitor for detected participant presence on any of the hazard panels; and
    in response to detected participant presence on any hazard panel, trigger execution of a penalty step in said gameplay sequence.

According to a second aspect of the invention, there is provided an interactive floor system comprising:
  a plurality of base modules for placement atop a subfloor, each base module defining at least one cell;
  a plurality of panels of equal quantity to a total number of cells possessed by said plurality of base modules for support atop one of the base modules in overlying relation to a respective one of the cells to define a respective partial area of a collective floor surface defined by upper faces of the plurality of panels;
  an illumination system operable to individually illuminate each panel;
  a sensing system operable to detect presence of any participant occupying the upper face of any panel of the collective floor surface, independently of whether presence of a participant is detected on any other panel of the collective floor surface; and
  a respective rim of flexible material spanning peripherally around the panel of each cell at peripheral regions of the upper face thereof.

According to a third aspect of the invention, there is provided an immersive amusement system comprising:
  a substantially enclosed room having an interior space and an entrance by which participants are admissible thereto;
  an interactive floor system installed in said room, and comprising:
    an array of panels laid out in one or more grids with the panels of each grid lying at generally equal elevation in generally coplanar relation to one another to collectively define respective areas of a floor surface;
    an illumination system operable to individually illuminate each panel of the array independently of any other panel of the array; and
    a sensing system operable to detect presence of any participant atop any panel of the array, independently of whether presence of a participant is detected on any other panel in the array; and
  a controller connected to the illumination and sensing systems and configured to send illumination command signals to the illumination system to change illuminated statuses of the panels of the array, and to receive detection signals from the sensing system denoting detected presence of participants on the panels of the array;
  wherein a floor space of said room is spanned in substantial entirety by said array of panels in at least a first direction measured between a first pair of opposing walls of said room.

BRIEF DESCRIPTION OF THE DRAWINGS

One embodiment of the invention will now be described in conjunction with the accompanying drawings in which:

FIG. 9 is a perspective view of one of a plurality of identical base modules from which a base frame of the interactive floor is assembled, each module defining four neighbouring cells of the assembled interactive floor.

FIG. 10 is an overhead plan view of the base module of FIG. 9.

FIG. 11 is a cross-sectional view of the base module of FIG. 10, as viewed along line A-A thereof.

DETAILED DESCRIPTION

Figure 1:
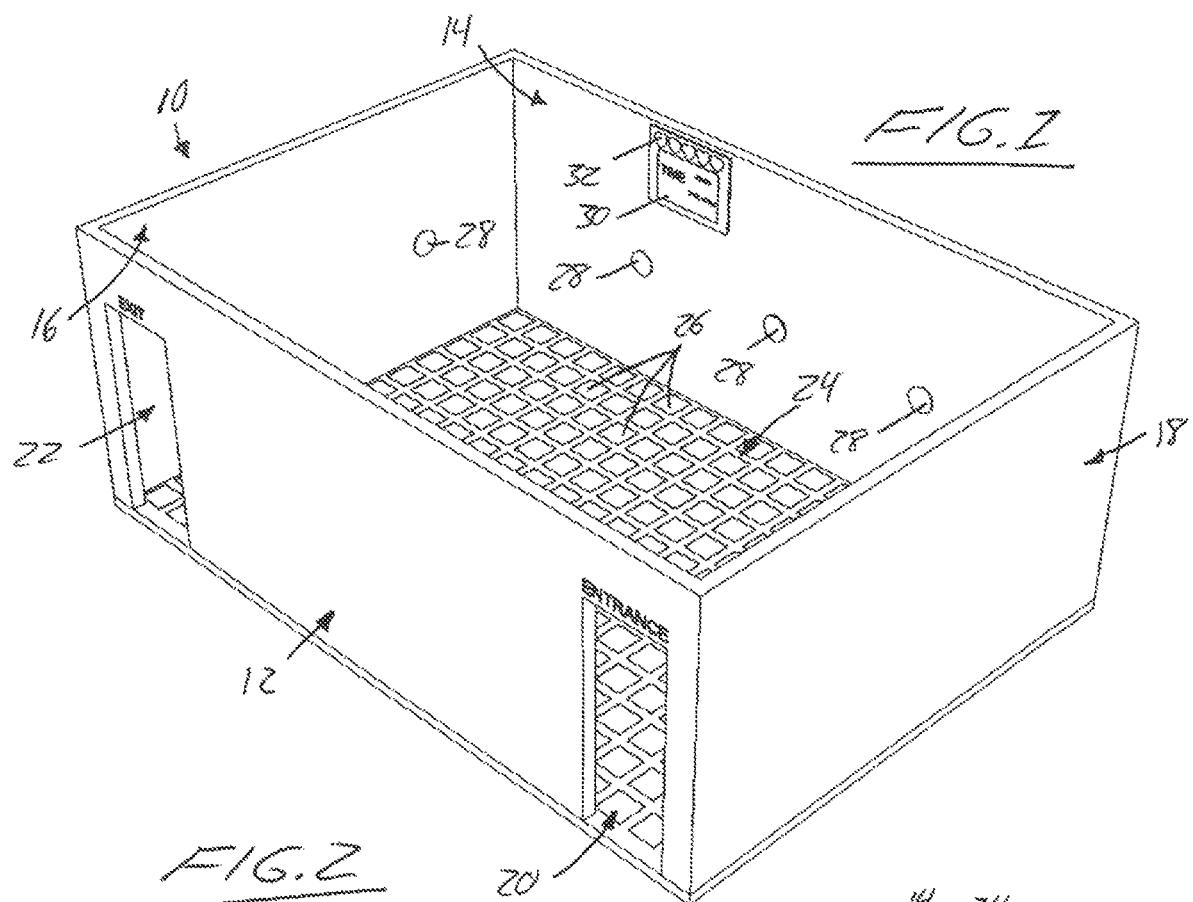
FIG. 1 is a perspective view of an immersive amusement environment employing an enclosed game room whose floor area is spanned wall-to-wall in both directions by an interactive floor featuring an array of illuminable, weight-responsive cells.

Referring to FIG. 1, an immersive amusement environment is shown in the form of an enclosed game room 10 having an upright perimeter wall structure composed of a front wall 12, an opposing rear wall 14, a first side wall 16 and an opposing second side wall 18. The front wall 12 features both an entrance 20 to the room and a separate exit 22 therefrom, for example near respective ends of the front wall 12, though the game room may alternatively have a shared entrance/exit opening by which the game room's interior space is both entered and exited. In embodiments with a separate entrance and exit, they need not be located at the same wall.

The perimeter wall structure delimits a floor space of the room, a substantial entirety of which is occupied by an interactive floor system 24 defining an array of rectangular cells 26 that collectively span a substantially full dimension of the room's interior space in each of its two horizontal directions of measure. The cell array thus substantially spans both a width dimension of the room measured perpendicularly between the two opposing side walls 16, 18, and a depth dimension of the room measured perpendicularly between the opposing front and rear walls 12, 14. Accordingly, upon entry into the room, a participant in the amusement attraction will inherently be forced to stand upon the interactive floor, thus ensuring their mandatory interaction therewith during execution of a gameplay session inside the room.

In addition to the interactive floor 24, the room 10 also features one or more interactive target devices 28 mounted in elevated relation above the interactive floor, whereby gameplay inside the room may involve both foot-based physical interaction with the interactive floor cells (stepping, jumping, foot-tapping etc.), and hand-based or other upper body physical interaction with the separate target devices 28. Preferably there are multiple target devices 28 distributed around the room. In the illustrated embodiment, the target devices 28 are wall-mounted target devices, of which each perimeter wall of the room features at least one. Preferably there are multiple target devices 28 on all or some of the walls, optionally in varying quantities that may be proportional to the relative wall size, as demonstrated in the illustrated example where the longer rear wall 14 of the room has three target devices, while the relatively shorter side walls 16, 18 each have only two target devices 18. Though the front wall 12 is just as long as the rear wall 14 in the illustrated example of FIGS. 1 to 3, the effective length of the front wall 12 is shortened by the provision of the entrance 20 and exit 22 in this front wall 12, which therefore has a reduced quantity of target devices relative to the opposing rear wall 14, and particularly only one target device in the illustrated example. That being said, the quantity of targets need not necessarily be reduced on walls of shorter true length or effective length. Each target device 28 may be a push-button device, touch-sensitive panel, or any other electronic device capable of receiving a physical input denoting an actuation of said device, preferably via handpress or other upper body interaction by a participant, though contact with a raised foot, knee, hip or other body part may optionally be employed by participants.

As can be seen in FIG. 1, in addition to the target devices, 28 the interior space of the game room 10 in the illustrated embodiment also includes at least one performance display operable to display performance feedback to the participant(s) during a gameplay session. The performance display(s) may, for example, show one or more of: a score tally of incrementing/decrementing points values during successful completion or failure of assigned tasks during gameplay; a running timer; and/or a status meter whose level is incremented or decremented in response to detected failures, similar to a life-bar or health-meter of a video game. In the illustrated embodiment, instead of maintaining a separate score tally, a countdown timer is alone used to both limit the duration of a gameplay session, and to at least partially govern a scoring scheme under which points are only awarded at the end of the gameplay session if all assigned tasks are completed before expiry of the countdown timer. If the countdown timer expires and any assigned task remains incomplete, the participant(s) is/are deemed to have lost the game, and no points are awarded. If all assigned tasks are completed before expiry of the countdown timer, then the participant(s) is/are deemed to have won the game, and is/are awarded a score value equal to the value of the countdown timer at the point in time when the final task was completed. If the life/health status of the status meter reaches zero before expiry of the countdown timer, the gameplay session is terminated prematurely, with the participant(s) being deemed to have lost the game, and therefore being awarded no points regardless of the value of the countdown timer at the premature termination of the gameplay session.

In the illustrated example, the running value of the countdown timer is shown on a score display 30, for example a wall-mounted flat-screen monitor, and the status meter is shown in a separate status display 32, for example in the form of a plurality of discrete illuminable indicators each representing a respective life or health point that changes from one status to another (lit or unlit) in response to a detected gameplay failure. For example, a series of heart-shaped indicators may initially occupy a fully lit state representing a full-life or full-health status of maximum lives or hit-points, and then be turned off one-by-one in response to each gameplay failure detected in the game session, until none of the indicators are lit. Alternatively, rather than the discrete indicators being heart-shaped to denote health or livelihood when illuminated, they may be X-shaped or skull-shaped to denote health damage or loss of life, thus all starting in an unlit state and then being illuminated one-by-one in response to gameplay failures until all indicators are illuminated. Either way, once all the indicators have changed state, this denotes a loss of the game by its participants, i.e. a "game over" status. The status display 32 may optionally be incorporated into the score display 30. Instead of using the timer for one-time score determination at the end of a won game, an accruing score tally may be instead maintained independently of the timer during the gameplay session, in which case the running score tally may be shown on the score display 30, optionally together with the running countdown timer.

Figure 6:
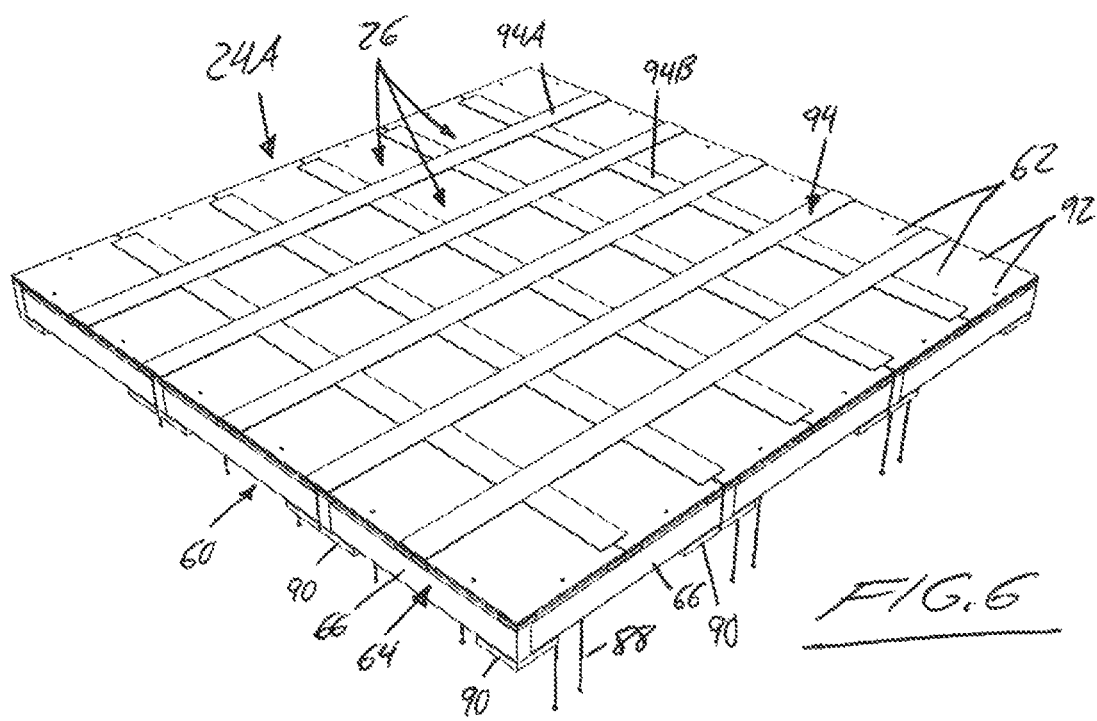
FIG. 6 is a perspective view of a section of the interactive floor from the game room of FIG. 1 or 4.

FIG. 6 illustrates a section 24A of the interactive floor 24 in isolation from the room 10, from which it can be seen that the floor features a base frame 60 for supporting all other components of the interactive floor 24 atop the underlying room floor, which is also referred to herein as a subfloor to distinguish over the floor surface defined by the interactive floor system installed atop the room floor. Atop the base frame 60 are rested a plurality of floor panels 62 placed in closely neighbouring relation to one another in both of the two horizontal dimensions spanned by the underlying base frame 60 so that the topside of the base frame 60 is spanned by rows of such floor panels 62 in both directions. Each rectangular (preferably square) floor panel 62 occupies a corresponding rectangular (preferably square) area of the underlying base frame 60, which together cooperatively denote a respective rectangular cell 26 of the interactive floor.

FIG. 9 shows an individual base module 64, a plurality of which are used to assembled the overall base frame 60 of the interactive floor 24. In the illustrated example, each base module defines a set of four respective bases for four neighbouring cells 26 of the interactive floor, laid out in a 2×2 rectangular array. An outer perimeter of the base module 64 is composed of four linear perimeter members 66 connected end-to-end at right angles to one another to define the overall rectangular outer perimeter of the base module 64, and thereby also delimiting a rectangular interior space of the base module 64. A set of linear divider members 68 each span perpendicularly between two opposing perimeter members at midpoints therealong, and thereby divide the overall interior space of the module into four smaller rectangular spaces 70, each belonging to a respective one of the module's four cells. In the illustrated example, based on prototypes whose perimeter and divider members are composed of wooden 2×4s, the divider members 68 are doubled up in adjacently abutting pairs, whereby two interior sides of each cell base are each defined by a respective half of a divider member, instead of sharing this half of a same divider member with the adjacent side of a neighbouring cell. That being said, shared dividers members may be employed in other variants of the module, which need not necessary be of wooden lumber construction, and may for example may be of molded plastic construction. The two outer sides of each cell base are each defined by a respective half of one of the outer perimeter members 66 of the module 64.

The base module 64 thus defines four rectangular cell bases each having a rectangular interior space 70 bound on four sides by structural members 66, 68 of the base module 64. On all four sides of this interior space 70, an inner face of the respective structural member 66, 68 on the side thereof facing into this interior space 70 is equipped with a respective length of RGB LED strip lighting 72. This strip lighting thus denotes a respective multi-colour illumination source of the cell that is capable of illuminating this interior space 70 of the cell in three different colours (Red, Green, Blue). The respective floor panel 62 of each cell is made of a transparent, or more preferably translucent, material enabling light transmission therethrough and capable of supporting the weight of human participants of varying age and size without permanent deformation. In one non-limiting example, the floor panels are made of translucent high-density polyethylene (HDPE), though other materials, preferably of polymeric composition, may alternatively be employed. Accordingly, activation of the LED strip lighting 72, or other multi-colour illumination device, of any cell will transmit light upwardly through the at least translucent material of the floor panel 62, thus emitting coloured light from the topside the panel 62 to illuminate the respective cell of the interactive floor.

Each cell base features a respective set of spacer pads 74 mounted atop its structural members 66, 68 at all four corners of the cell for the purpose of supporting the respective panel 62 in slightly elevated relation above the structural members 66, 68 of the base module 64. In the illustrated embodiment, each panel 62 is secured to the underlying cell base via cooperation of hook and loop fastener elements 76, 78 attached to the topsides of the base's spacer pads 74 and to the underside of the cell's floor panel 62 near the four corners thereof. On each of the four sides of each cell, the respective structural member 66, 68 of the cell base has a conductive contact plate 80 of a participant-sensing circuit mounted thereon at a generally central location between the two spacer pads 74 on that side of the cells base. The contact plate 80 is thinner than the spacer pads 74, whereby the top surface of the contact plate 80 resides at slightly lesser elevation than the top surfaces the spacer pads 74, and thus also at lesser elevation than the hook or loop fastener elements 76 mounted on the spacer pads 74.

Figure 12:
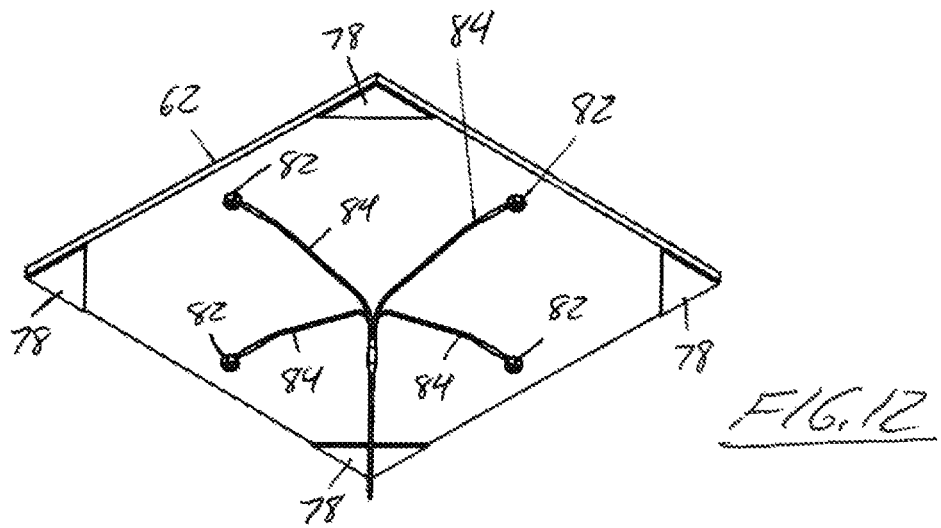
FIG. 12 is bottom perspective view of a floor panel that sits atop a respective cell of the base module to form a respective partial area of the overall interactive floor surface.
Figure 13:
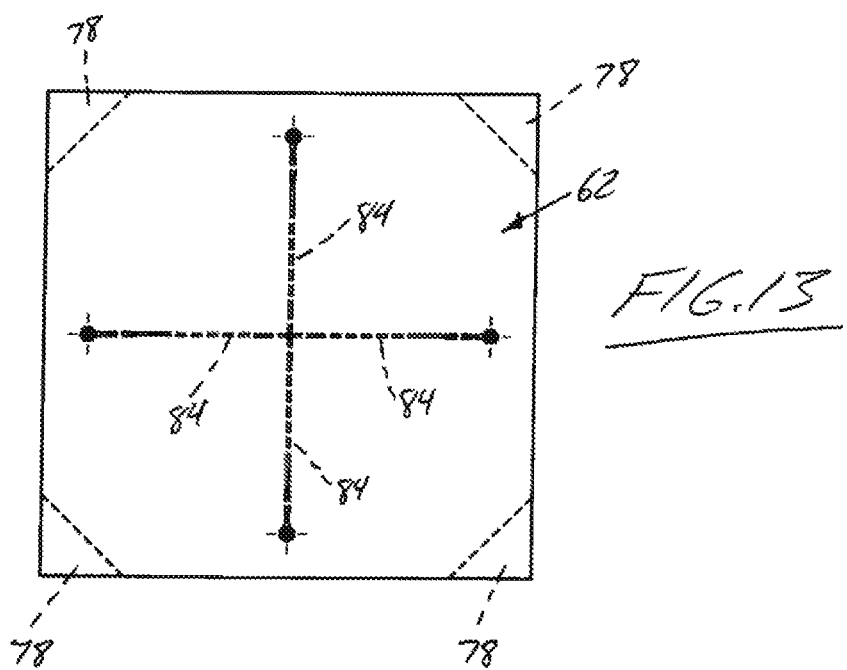
FIG. 13 is a top plan view of the floor panel of FIG. 12.
Figure 14:
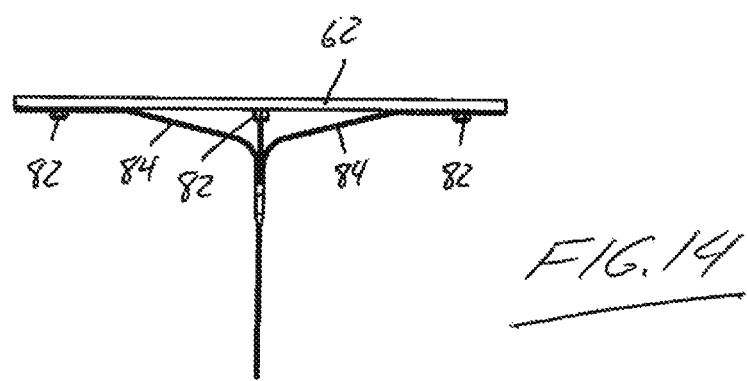
FIG. 14 is a side elevational view of the floor panel of FIG. 12.

FIGS. 12 through 14 show, in isolation, a singular respective floor panel 62 of one of the cells. The underside of the panel 62, in addition to the hook or loop fastener elements 78 adhesively attached at the corners of the panel, features four conducive contact lugs 82 each secured to the panel in protruding relation from the underside thereof. The contact lugs 82 are situated at peripheral regions of the panel 62, each near a respective side of the panel's outer perimeter at a central distance along this respective perimeter side, whereby the contact lugs are suitably positioned to align with the four contact plates 80 that reside at midpoints of the four perimeter sides of the cell base. The protruding distance of the contact lugs 82 from the underside of the panel 62 is less than the vertical spacing that normally resides between the underside of the panel and the contact plates 80 on the cell base when the floor panel 62 is installed atop the cell base, but not subjected to the body weight of a participant, or any other participant-exerted downforce. Only when the floor panel 62 is subjected to such body weight or other downforce are the contact lugs 82 on the floor panel 62 displaced downwardly into touching and electrically conductive contact with the corresponding contact plates 80 on the cell base. Such downward displacement of the contact lugs 82 on the underside of the panel 62 under the exerted body weight or other downforce on the topside of the panel 62 may enabled by (a) a resilient compressibility of the spacer pads 74; (b) resilient flexibility of the floor panels 62; or (c) a combination thereof.

As shown in FIGS. 12 to 14, a set lead wires 84 are connected to the contact lugs 82 from the interior cell space 70 beneath the panel 62, just as another set of lead wires 86 are likewise connected to the contact plates 80 of the cell base from within the interior cell space 70, as shown in FIGS. 9 and 10. Each contact lug 82 and corresponding contact plate 80 form a normally-open switch in a respective branch of a participant-detection circuit that is closed when a participant stands on, steps on or otherwise exerts body weight or other downforce on the respective floor panel 62 of a cell. The illustrated embodiment employs four such normally-open switches, each in a respective parallel branch of the sensing circuit, and each at a respective side of the rectangular cell, to ensure confident detection regardless of where the body weight or other downforce is exerted or concentrated on the panel, but it will be appreciated that the number of switches used may be varied. It will also be appreciated that the particular type of switch or other sensing arrangement employed to detect participant presence atop a given cell may be varied without detriment to other inventive aspects of the disclosed invention. Likewise, the type of light source used to achieve multi-colour illumination of each cell may be varied from the particular use of RGB strip lighting mounted around the perimeter of the interior space 70 of the cell base. For example, one could alternatively employ various designs known in the prior art for the construction of interactive, illuminable dance floors.

The lead wires from the four contact plates 80, four contact lugs 82, and LED strip lighting of the cell, are preferably bundled together in a respective singular wiring harness 88 for the given cell, as demonstrated by FIG. 9 where the four-cell module 64 can be seen to have four respective wiring harnesses 88, one for each individual cell. Each wiring harness 88 is plugged into a respective PCB control board for that particular cell, on which a micro controller operates to control the illumination status of LED strip lighting 72 between off, red, green and blue states; and to detect the closure of any of the normally open switches on the sensing circuit to thereby confirm the presence of participant body weight or exerted downforce on the cell's floor panel 62. The structural members 66, 68 of each module 64 have small riser feet 90 attached to the undersides thereof at the four corners of the module 64 to elevate the structural members off of the underlying room floor in the installed state of the interactive floor, whereby resulting gaps between the structural members and underlying room floor to enable routing of necessary wiring from the cells to other control hardware (described further below) via gap spaces between the room floor and the structural members of the base modules.

Figure 7:
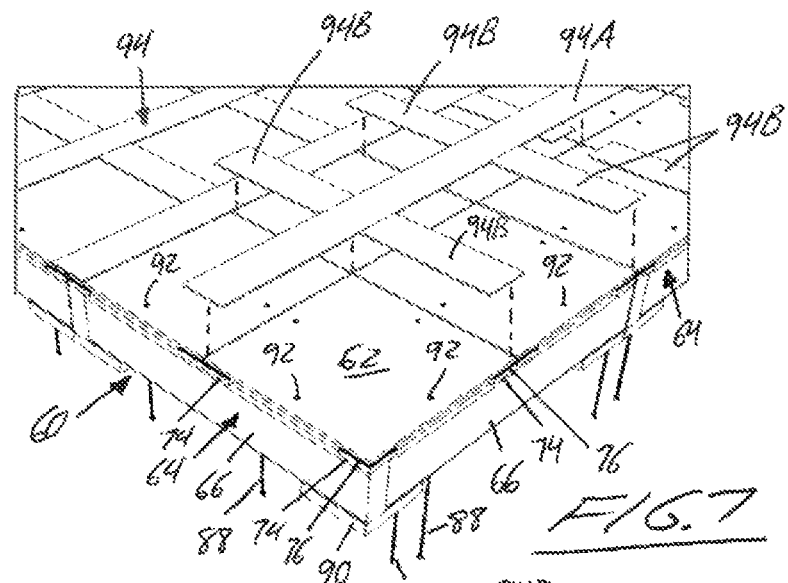
FIG. 7 is a close-up partial perspective view of the floor section of FIG. 7, with perimeter seals of some cells shown in exploded positions.
Figure 8:
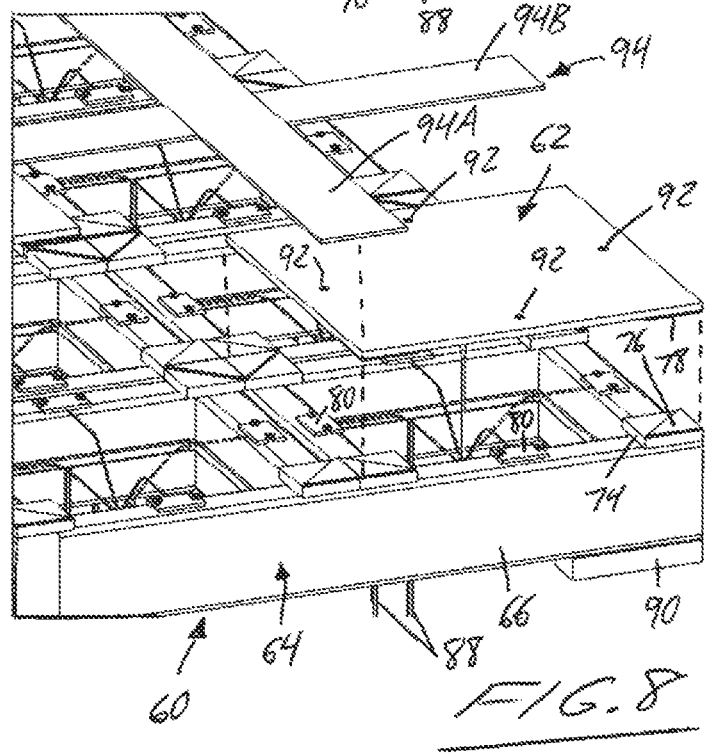
FIG. 8 is another close-up partial perspective view of the floor section of FIG. 7, with additional componentry thereof shown in exploded positions to reveal internal assembly details of the floor section.

In the illustrated embodiment, each contact lug 82 is a metallic nut secured against the underside of the floor panel 62 by a respective screw 92 that penetrates vertically through the panel 62 from the topside thereof. Referring to FIGS. 7 and 8, each panel thus has four such screws 92 residing centrally of the four peripheral regions of the panel 62. In the fully installed state of the interactive floor 24, the screws 92 are concealed from sight by perimeter seals 94 that are adhered to the upper faces of the floor panels 62 at the peripheral regions thereof on all four sides of all cells, thereby forming a slightly raised perimeter rim or lip around each cell. With the exception of wall-adjacent perimeter seals installed on outer cells of the interactive floor that neighbour the perimeter walls 12, 14, 16, 18 of the room 10, each perimeter seal 94 overlaps the floor panels 62 of two neighbouring cells, and is sufficiently wide to cover the peripheral regions of both floor panels of these two cells at the adjacent sides thereof.

A perimeter seal installed at adjacent interior sides of two neighbouring cells of the same module 64 is referred to herein as an inter-cell perimeter seal, while a perimeter seal installed at adjacent exterior sides of two neighbouring cells of two neighbouring base modules 64 is referred to herein an inter-module perimeter seal. Parallel in-line perimeter seals of adjacent cells in one row direction of the array may be seamlessly integral sections of a singular unitary strip 94A of sealing material, with the parallel inline seals of the other direction being separate individual seals 94B cut to shorter length to fit between the longer integral seals that run in the other direction of the array. Alternatively, long integral seals may be used in both directions by overlapping the seals at the corners of the cells, though this may be less preferably due to the resulting increased profile height at the points of overlap at the corners of the cells.

In addition to covering the screws 92, which are preferably counterbored into upper face of the floor panel so as not to create a raised bump in the perimeter seals 94, the inclusion of perimeter seals 94 creating a slightly raised lip or rim around the individual cells of the interactive floor present other beneficial advantages. Firstly, these rims improve the foot grip for participants walking or running around the room during gameplay, thus denoting notable departure from interactive "dancefloors" of the prior art in which a uniformly planar and continuous floor surface is desired across the entire dancefloor so as not to interfere with sliding foot movement during performance of dance moves. While floor panels 62 with textured upper faces could be used to additionally or alternative improve participant traction on the interactive floor 24, textured surfaces are more likely to collect dust and grime on the panels themselves 62, introducing cleaning challenges and reduced light-transmission performance of the illuminable panels 62 when dirtied. Accordingly, the use of smooth, untextured floor panels 62 of purely planar configuration at the upper faces thereof together with the inclusion of a raised perimeter rim or lip around each cell provides balance between provision of adequate foot grip and the cleanliness and optical performance of the panels.

Another benefit is particularly attributable to the inter-module perimeter seals in preferred embodiments where the base modules 64 are not bolted or otherwise fastened to one another, nor fastened down to the underlying room floor. Instead, the base modules 64 are simply laid out side-by-side on the room floor with the adjacent perimeter sides of the base modules 64 in closely adjacent, and preferably abutting, relationship to one another, and the only inter-coupling of the modules 62 to one another is an indirectly coupling thereof by adhered application of the perimeter seals 94 to the floor panels 62 of the modules. The perimeter seals 94 are made of a flexible material, and thus can be used to accommodate slight variation or non-uniformity in the levelness of the underlying room floor on which the base modules 64 are placed. The flexibility of the adhered perimeter seals can thus cover any subtle gaps between the base modules and their floor panels, and act to smooth the transition between the floor panels 62 of two adjacent modules that might have a slight angular offset between them (i.e. deviating from 100% coplanar relationship with one another) due to variation in the room floor beneath the base modules 64.

The room 10 is constructed to be of a shape and size making the floor space approximately equal to an integer multiple of the rectangular area possessed by each of the identical base modules 64, with only a slight extra allowance in each of the room's two dimensions to ensure sufficient clearance during placement of the modules atop the floor space in that that integer quantity. The extra allowance is preferably less than the individual cell width of the modules. As a result, a substantial entirety of the floor space is therefore occupied by the base modules of the installed interactive floor 24, whereby even though the cells of the different modules are coupled together only by the adhered application of the perimeter seals 94, separation of the modules from one another is prevented or limited in each horizontal direction of the room by the constraint imposed on the floor-placed modules by the perimeter walls of the room that oppose one another in that direction. This full occupation of the room by the interactive floor 24 imposes mandatory participation in the gameplay by any room occupants, allows quick and easily installation of the interactive floor without bolted or otherwise fastened interconnection of the base modules, and prevents significant separation gaps from opening up between the modules in the event of slight module shifting, due to the constraints imposed by the wall geometry of the room.

Meanwhile, the inter-module perimeter seals cover up any small gaps that may exist between modules due to slight elevational variations in the room floor. Any slight gaps remaining between the placed modules and the room's perimeter walls may be fully partially filled with shims, spacers, or filler material. Like any non-perimeter base modules that don't directly neighbour the perimeter walls of the room, the wall-adjacent modules may also have perimeter seals applied to all perimeter sides thereof, where at the wall-adjacent sides of these modules, the perimeter seal may be adhered to the adjacent room wall, thus covering any gap and shim, spacer or filler between the module and the room wall.

Figure 2:
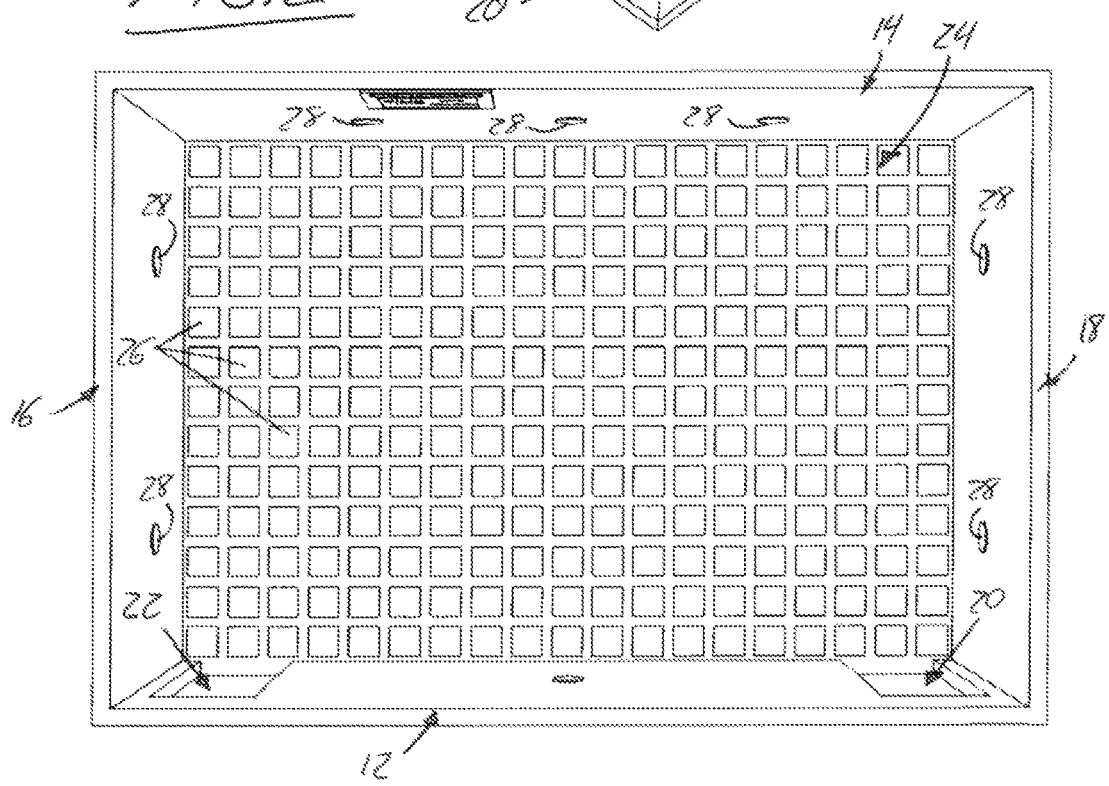
FIG. 2 is an overhead view of the game room of FIG. 1.
Figure 3:
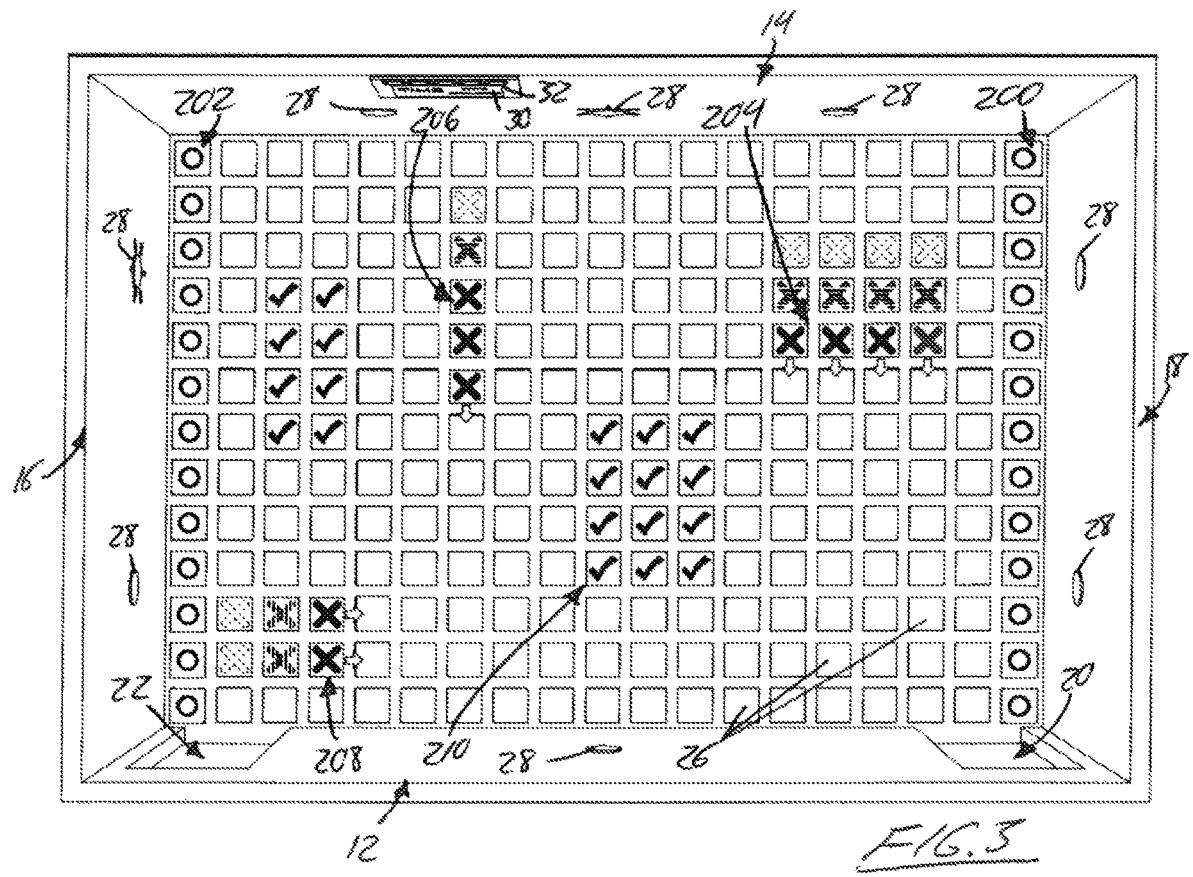
FIG. 3 is another overhead view of the game room of FIG. 1, schematically illustrating distinct illumination of different cells of the array to form different safe zones, hazards and targets to be interacted with by participants during gameplay.
Figure 4:
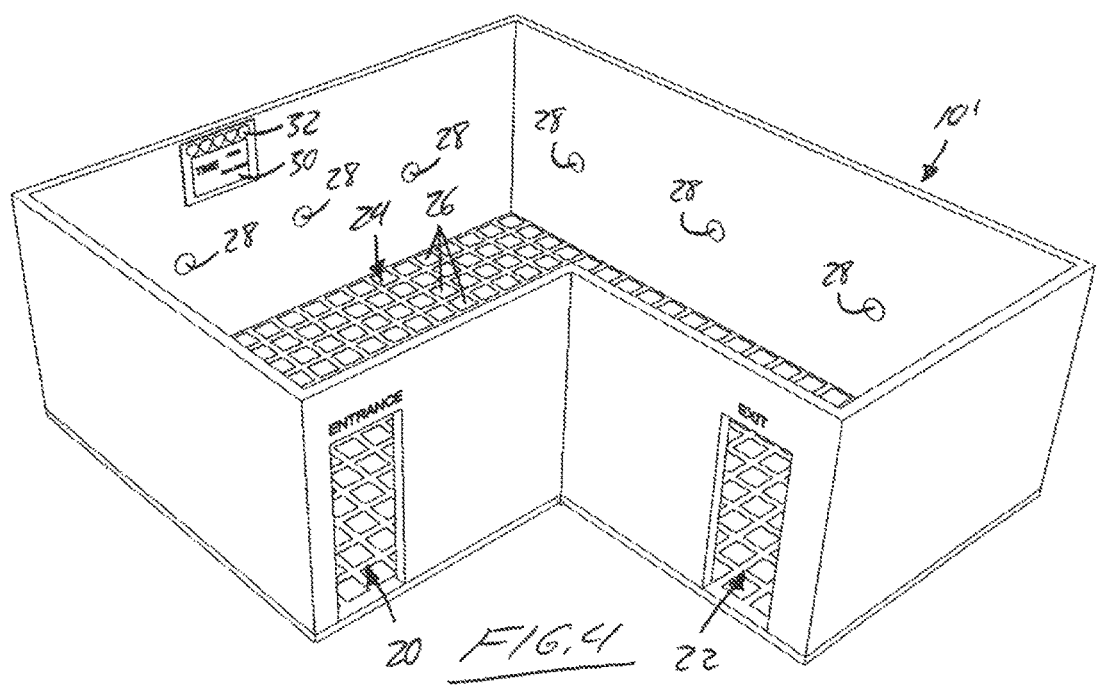
FIG. 4 is a perspective view of a variant of the immersive amusement environment of FIG. 1, illustrating optional variation in the size and layout of the enclosed game room.
Figure 5:
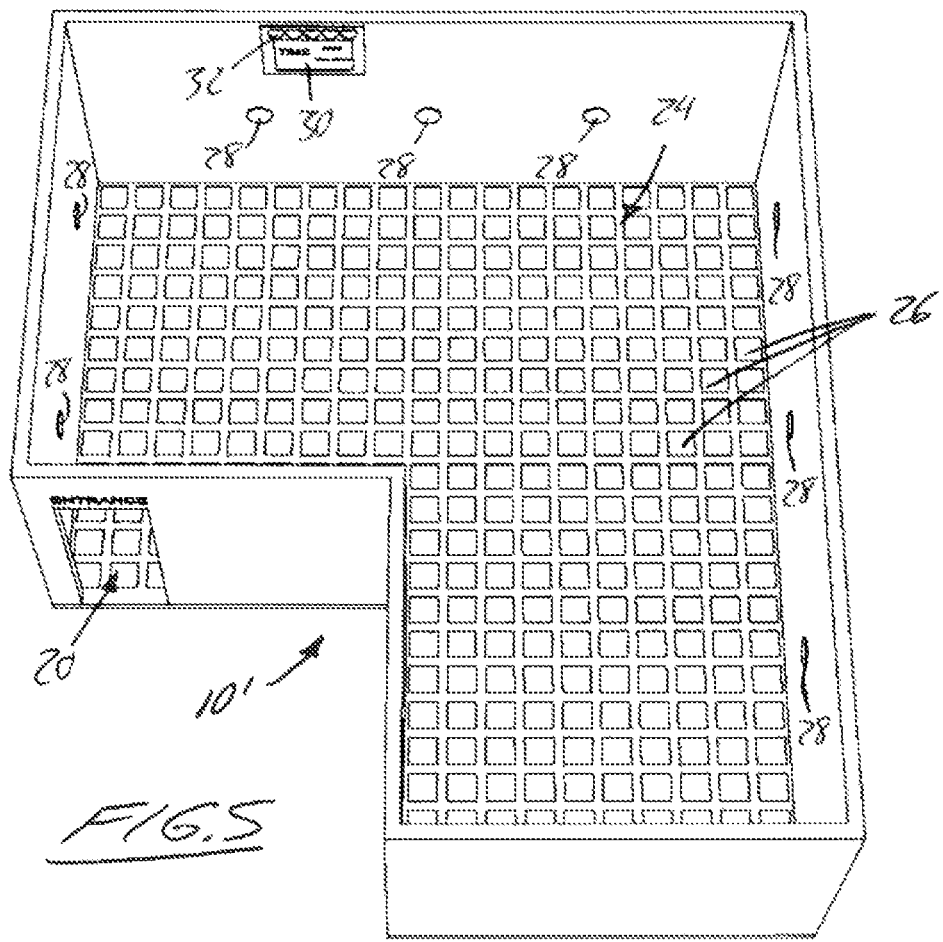
FIG. 5 is an overhead view of the variant of FIG. 4.

It will be appreciated that the room 10 need not be limited specifically to a purely rectangular shape like that shown in FIGS. 1 to 3. This is demonstrated in FIGS. 4 and 5, where an L-shaped room 10' has two rectangular wings each fully occupied by a respective rectangular grid of cells assembled from the same modules 64 and panels 62 described above. The cell illumination devices and sensing circuits of both grids are individually addressable by the controller in the same manner as for a singular rectangular grid, whereby the two grids collectively form a larger overall room-filling array of interactive floor cells. It will also be appreciated that while the illustrated embodiment employs multi-cell base modules 64, embodiments with single-cell base modules could likewise benefit from the use of perimeter seals therewith in the above described manner. Where multi-cell base modules are employed, they also need not be limited to a square 2×2 cell configuration, and may be provided in other cell quantities and non-square rectangular configurations.

Figure 15:
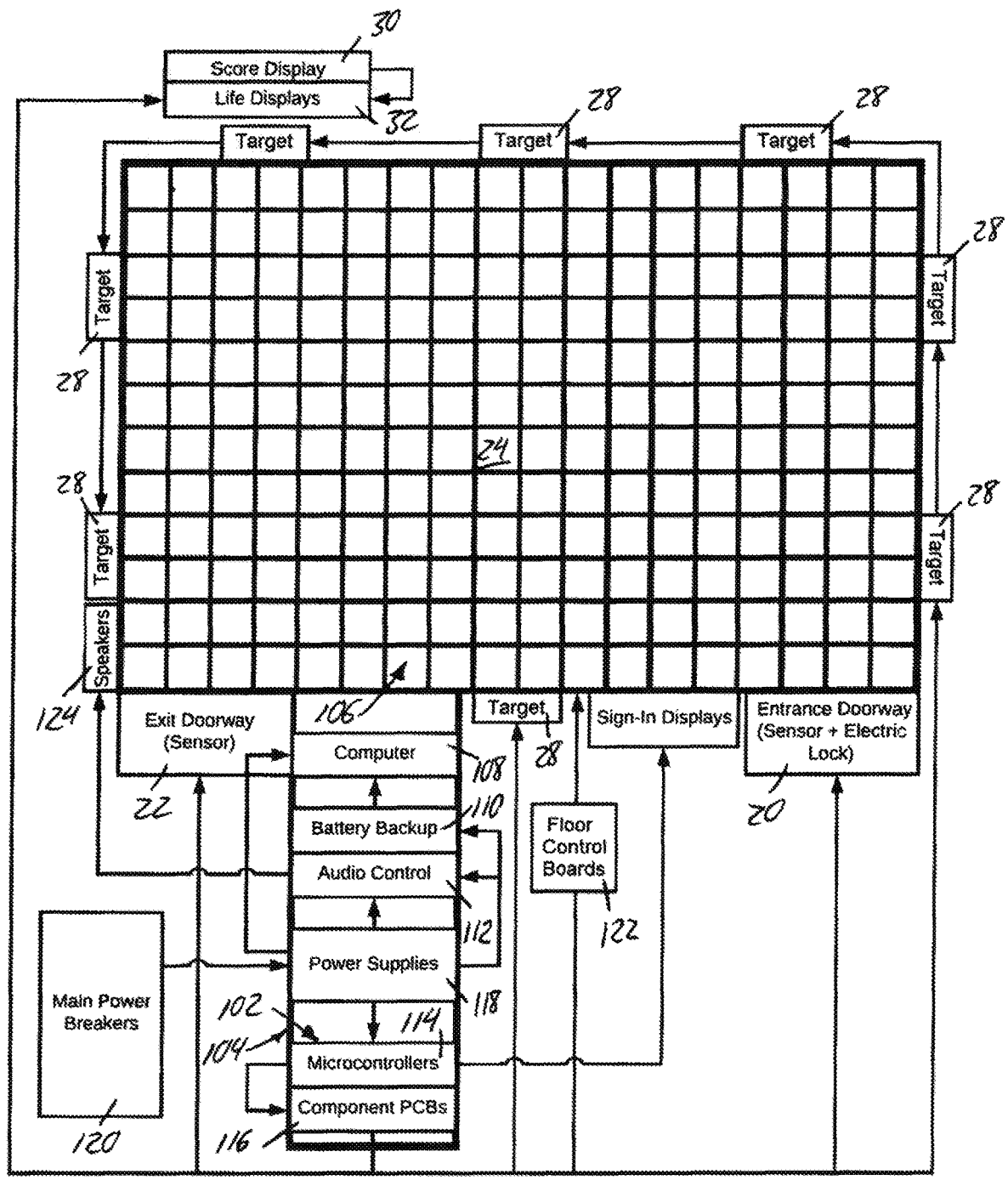
FIG. 15 is a schematic illustration of a control system for the immersive amusement environment of FIG. 1 or 4.

FIG. 15 schematically illustrates a room control system 100 of the game room 10. The room control system 100 features a collection of control hardware 102, preferably stored in a utility closet 104 situated outside the interior gaming space 106 of the room 10 occupied by the installed interactive floor 24. In the illustrated embodiment, the control hardware 102 includes one or more local computers 108, a battery backup 110, audio control components 112 including at least an audio amplifier, microcontrollers 114, component PCBs 116, and power supplies 118 through which the other control hardware components are powered via main power breakers 120 situated further upstream in the facility's electrical system. Based on input commands from the local computer 108 during execution of game-control software installed thereon, the micro-controllers 104 drive the component PCBs of gameplay elements installed within the internal space of the room for interaction therewith by participants during gameplay, which in this case includes the control boards 122 of the interactive floor cells. Accordingly, the control hardware 102 collectively forms a controller that governs automated execution of a gameplay session within the internal space of the game room. The audio control components 112 are connected to one or more loudspeakers 124 likewise installed in the internal space of the game room 10 for playback of game-related audio to the participants during such gameplay, for example verbal commands guiding the participants as to assigned tasks they are to perform during the gameplay session.

The room control system 100 may be one of a plurality of room control systems that are installed among a plurality of respective game rooms in a shared facility, and are networked together over a local area network as part of a larger overall computerized facility management system. Such facility management system may include a facility management server that hosts, or is communicable with, a local participant database for storing participant profiles and associated scoring records of the participants. There may also a central participant database that is hosted remotely of the facility, for example in a cloud server environment, and is communicable with the facility management server via the internet or another wide area network so that participant profiles from the local participant database can be used to populate the central participant database. The facility management servers of additional facilities can thus access and populate the central participant database, whereby a participant can attend multiple facilities and the scoring results from games played at multiple facilities can be compiled together. Further details on the facility management system, and functions of the room control system 100 other than the interactive floor gameplay processes described herein, are disclosed in Applicant's prior U.S. Provisional Patent Application No. 62/846,912, filed May 13, 2019, the entirety of which is incorporated herein by reference.

In the illustrated embodiment of the present invention, the game elements operated by the controller 102 include the interactive floor cells 26; the target devices 28; and the score/timer display 30 and status display 32. The controller 102 is configured to enable selective illumination of any one or more of the floor cells 26 in any one of the strip LEDs three colours (Red, Green, Blue) by sending an appropriate illumination command signal to the control board of that cell. Likewise, the controller is configured to monitor for a positive participant-detection output signal from the control board of any of the floor cells in order to recognize when a participant is present at a given floor cell, as confirmed by the control board's detected closure of one or more of the normally-open switches of that cell's sensing circuit.

Having described the general componentry and layout of the immersive amusement environment 10, attention is now turned to particularly novel methods of use. FIG. 3 illustrates a snapshot of the room at some point during a gameplay session making use of both the interactive floor 24 and the wall-mounted targets 28. During gameplay, illumination of the floor panels 62 in three different colours represents three different cell status categories used during gameplay, and thus visually distinguishable to the participants. In a preferred implementation, green panels denote "safe" panels on which participants can stand without penalty, blue panels denote "target" panels that the participants are tasked to physically interact with by exertion of foot-applied downforce thereon (by standing, stepping, jumping or foot-tapping the panel), and red panels denote "hazard panels" that the participants are specifically to avoid stepping on as they traverse the interactive floor to fulfill the assigned tasks of the gameplay session. Since the black and white line drawings do not convey colour content, the different categories of panels are instead represented using different distinguishable symbols. Panels marked with a circle are safe panels, panels marked with a checkmark are target panels, and panels marked with an "X" are hazard panels. Any panels left unmarked are unilluminated "inactive" panels, thus falling into none of the forgoing three gameplay status categories.

In the illustrated scenario, at least one row of safe panels 200 spanning the length of the side wall 18 near the room entrance 20 are illuminated in green, thus denoting a safe starting zone at which newly admitted participants to the room can stand to start the game. Another one or more rows of safe panels 202 spanning the length of the opposing side wall 16 near the room exit 22 are likewise illuminated in green, denoting a safe destination zone for participants to arrive at upon having fully traversed the width of the room from the starting zone.

A first moving hazard zone 204 situated near the safe starting zone 200 comprises a group of four hazard panels that changes over time in a sequential fashion moving across the depth dimension of the room between the opposing front and rear walls 12, 14 thereof. The figure illustrates time-base variability in the particular member panels of any moving hazard zone by using an unfilled broken line X to show a previously illuminated panel that has since reverted back to a fully darkened (unilluminated) state from a previously illuminated state, a partially filled X to denote a previously illuminated panel whose light source has been more recently deenergized and is thus fading back to its default darkened state, and a fully filled X to denote a currently illuminated panel whose light source is in its energized state in the hazard colour (red). The first moving hazard zone in the illustrated example is a group of four panels in a same singular width-wise row of the interactive floor 24, and the room snapshot shows the variable group of panels migrating sequentially toward the front of the room on a row-by-row basis.

To achieve this, the controller 102 commands energization of the illumination devices of four cells in the same width-wise row of the cell array in the hazard colour (red) for a brief momentary period, then deenergizes these four cells and energizes a matching next set of four cells in the next width-wise row of the cell array in the hazard colour for another momentary period, and repeats this process serially row-by-row until the latest set of energized hazard panels are in the row nearest the front wall 12 of the room. This sequential activation and deactivation of hazard panels may then be repeated identically, starting from adjacent the rear wall 14 and moving toward the front wall 12 to create a repeating singular-direction sweep of the moving hazard zone 204 across the room depth, or instead repeated in the reverse order back toward the rear wall 14 to create an alternating bi-directional sweep of the moving hazard zone 204 back and forth across the room depth. The energization period for each illumination step may be equal to provide constant-velocity migration of the moving hazard across the room, or the energization period may be varied between different sequential steps to alter the movement velocity and create a greater challenge by reducing predictability of the hazard movement to the participant's trying to avoid contact therewith as they traverse the interactive floor.

A second moving hazard zone 206 situated nearer to the safe destination zone 202 comprises a group of three hazard panels that also changes over time in a sequential fashion moving across the depth dimension of the room, but has its three simultaneously illuminated panels in a same singular depth-wise row of the interactive floor 24. By comparison with the first moving hazard, this demonstrates that a shared-row set of hazard panels may move in parallel relation along the row they occupy (like the second moving hazard zone 206), or may move in perpendicular relation to the row they occupy (like the first moving hazard zone 208). In the case of the second moving hazard zone 206, instead of energizing and deenergizing the illumination devices of all three cells at the same time, the individual cell at the trailing end of the set in the movement direction is deenergized as a next individual cell in the direction of movement is energized at a leading end of the set, so that the variable group moves incrementally in single-step fashion across the room depth. Once again, the process may be repeated identically to perform a repeating singular-direction sweep of the moving hazard across the room, or repeated in the reverse order to perform an alternating bi-directional sweep of the moving hazard zone back and forth across the room.

Moving hazards need not be limited movement in the depth direction of the room, nor in a direction perpendicular to the participant-tasked travel direction between starting and destination zones. This is demonstrated in the illustrated example by inclusion of a third moving hazard zone 208 which is shown near the front wall 12 of the room, and comprises a group of two hazard panels that also changes over time in a sequential fashion, but moves across the width dimension of the room to be traversed by participants between the designating start and destination zones 200, 202. Like the first moving hazard 204, the panels of this third moving hazard 208 are laid out in a shared row lying perpendicular to the hazard's direction of movement, thought this need not be the case, as demonstrated by the second moving hazard 206. It will also be appreciated that additional or alternative moving hazards may be composed of a singular changing hazard panel, as opposed to a changing group of multiple hazard panels, and that the direction of movement need not be parallel to a width-wise or depth-wise row of the cell array, and may for example be executed on a diagonal path of the cell array. Also, where a moving hazard is a multi-panel group hazard like those of the illustrated example, the hazard need not be limited to hazard panels in a singular row perpendicular to the direction of movement (like the first or third hazard), or panels in a singular row parallel to the direction of movement (like the second hazard). That is, a hazard may be multiple rows deep in its direction of movement and multiple rows wide across its direction of movement to create a greater challenge to the participants. In the illustrated example, two clustered groups of target panels 210, 212 are illuminated, of which first group of target panels 210 resides between the first and second moving hazard zones 204, 206 in the width direction of the room between the starting zone 200 and the destination zone 202, while the second group of target panels 212 resides between the second moving hazard zone 206 and the destination zone 202 in this same width-wise travel direction of the participants. Participants thus must travel from the starting zone 200 to the first group of target panels 210 without stepping on the changing panels of the first or third moving hazard zones 204, 208, step on all panels of the first target group 210, and also reach and step on all panels of the second target group 212, without stepping on the changing panels of the second or third moving hazard zones 206, 208. While the illustrated example features moving hazards, it will be appreciated that non-moving hazards may additionally or alternatively be included in any gameplay scenario, and may include one or more static hazards maintained in a continually illuminated state in the hazard color, and/or one or more blinking hazards whose illumination sources are being repeatedly energized and deenergized to denote switching between hazard status and inactive status, or alternated between illuminated states of different colour (red and blue) to denote switching of the panel between a hazard status and target status.

The wall-mounted targets 28 (wall targets, for short) add an optional extra layer of gameplay interaction to the assigned gameplay task, where the controller 102 also assigns an active status to one or more wall targets 28 that also must be actuated by the participants to successfully complete the task. Preferably, the active status is visually identified to the participants by the controller's energization of an illumination device incorporated into, or aimed at, said wall target 28 so that the active status of that target is visually distinguishable from any inactive target that is either unilluminated, or illuminated in a distinctly different colour from any active wall targets. In FIG. 3, one target on the rear wall 14 is shown as an illuminated active wall target, as is one target on the side wall 18 at the destination zone 202.

During gameplay, the controller 102 continually monitors for participant detection signals from any cell 26 currently assigned a hazard or target status, and from any active wall target 28. In response to detected participant presence on a hazard panel, the controller 102 decrements the current value of the status meter 32 by one life or health point. In response to detected participant presence on a target panel, the controller 102 changes the status of that cell from its previously assigned "target" status to an "inactive" status, and deenergizes that cell's illumination source accordingly so that a participant knows that their actuation of that cell's target panel has been properly recognized when the cell goes dark, denoting that it's no longer an active target. Likewise, detected actuation of a wall target 28 causes the controller 102 to switch that wall target's status to inactive, and to deenergize that target's illumination source (or switch the colour thereof) in order to visually inform the participants of its now inactive status.

Figure 16:
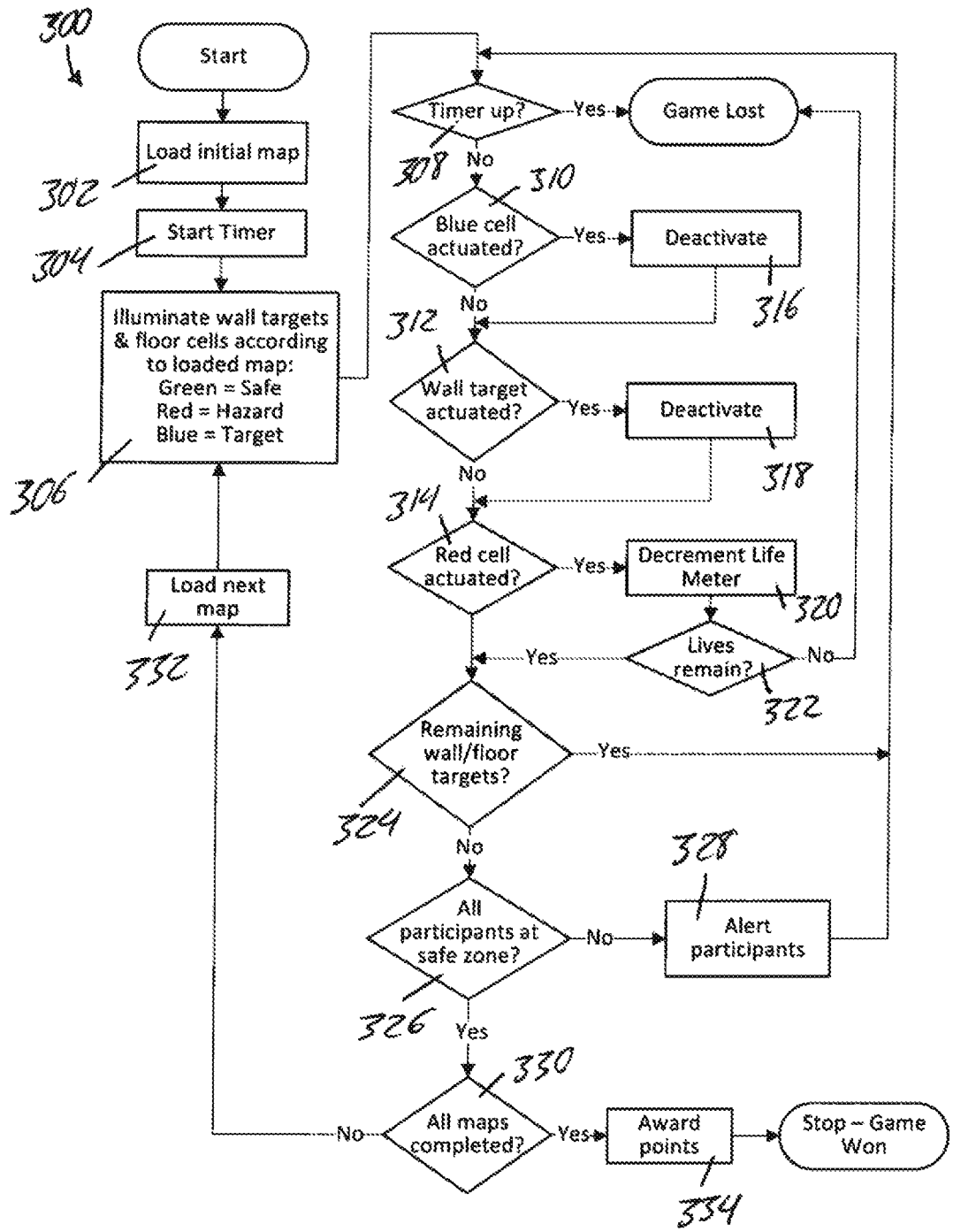
FIG. 16 is a flowchart illustrating a computer implemented process by which the control system of FIG. 15 executes a non-limiting exemplary game play session within the immersive amusement environment of the earlier figures.

FIG. 16 shows one example of a computer-implemented process 300 performed by the controller 102 to carry out a gameplay session in the illustrated game room 10, where the primary or exclusive gameplay task assigned to the participants is to step on all target panels of the interactive floor 24 and hand-press or otherwise actuate all active wall targets 28, without stepping on any hazard panels. A gameplay session may involve multiple rounds of play, up to certain predetermined number whose successful completion by the participants denotes winning of the game. From round to round, the particular pattern of hazard and target panels mapped on the interactive floor by the controller 102 is varied based on automated selection from among pre-programmed mapping routines encoded within the game execution software, whose executable statements and instructions are stored in non-transitory computer readable memory of the one or more local computers 108 for execution by one or more processors thereof. With each iteration from one round to the next, the particular mapping routine executed by the controller 102 may vary in any one or more of: the quantity and position of target panels in the interactive floor; the inclusion, omission, quantity and particular selection of wall-mounted targets to accompany the floor-based target panels; the quantity size, shape, position and/or non-moving vs. moving status of the hazard panels; the direction and/or velocity of movement of moving hazards; and/or the constant vs. blinking status of non-moving hazards. Optionally, the complexity of challenge presented may be increased with passing rounds, whether with each individual round, or periodically after a certain number of rounds of relatively similar complexity.

At the first step 302 of the process 300, the game session is initialized by having the controller 102 load an initial mapping routine from among a selected batch of the pre-programmed routines encoded within the game execution software. Via an electronic sign-in station of the room that is connected to the local computer(s) 108, as shown in FIG. 15, the participants may be able select different game options for the given game session prior to initialization thereof, for example to select from among different difficulty levels of escalating value (Level 1, Level 2, Level 3, etc.). To better ensure gameplay does not become predictable to repeat participants, the batch of routines for a game session may be selected randomly from among a larger pool of level-specific routines, optionally with further randomization of the order in which the batched routines are loaded and executed in the gameplay session. The sign-in station preferably resides near the entrance of the room, and preferably outside the room to enable sign-in by waiting participants while current participants are involved in a gameplay session inside, and may be used to govern the admission of participants, for example in the manner described in applicant's aforementioned U.S. provisional patent application incorporated herein.

In preferred embodiments where a gameplay session is a timed session having a predetermined time limit, then at step 304 the controller 102 starts running the timer to countdown the predetermined time limit, and shows the running countdown timer on the score display 30 of the room throughout the duration of the gaming session. Together or concurrently with starting of the timer, the controller 102 illuminates the safe, target and hazard panels in their different colours at step 306 according to the loaded mapping routine, and likewise illuminates any active wall targets likewise dictated by the loaded mapping routine. Instead of being illuminated during initialization of the session, the safe panels may optionally be pre-illuminated in an initial pattern before start of the gameplay session to denote where the participants can safely stand as the first floor map is loaded and initialized.

With the target and hazard panels now illuminated, along with active wall targets if included in the room and assigned by the loaded mapping routine, and with the hazard panels being varied over time if the currently selected mapping routine includes moving hazards, the controller 102 continually monitors for: expiration of the timer, participant actuation of any blue target panel, participant actuation of any active wall target, and participant actuation of any red hazard panel, as shown respectively at steps 308, 310, 312, 314. The illumination of the floor panels and wall targets at step 306 may also be accompanied by automated playback of verbal instructions over the loudspeaker 124 to inform the participants that their task is to reach and actuate the target panels and wall targets without touching any of the hazard panels, and optionally to traverse the room to the safe destination zone 202 if this an assigned task of the current round based on the loaded mapping routine. In some embodiments, or in particular rounds or levels, traversal of the interactive floor surface to a particular destination zone may be excluded from the participants' assigned task. In place of such tasked destination, completion of the round may simply require that the participants proceed to any green safe zone, the size and positions of which may vary from the illustrated example that has two isolated safe zones at opposing ends of the room. For example, in one variant, a designated safe zone may span around the full perimeter of the room, and delimit within this full-perimeter safe zone an active playing space within which all hazards and target panels are constrained to allow participants the ability to always step or hop into a nearby safe zone to avoid a given hazard.

If expiration of the timer is detected at step 308, then this denotes loss of the game by the participant(s), and the controller 102 terminates the game session. Otherwise, the game session continues. If actuation of a blue target panel is detected at step 310, then at step 316, the controller 102 changes the mapped status of this panel from a target panel to an inactive panel, and deenergizes the illumination source of the cell accordingly. Likewise, if actuation of an active wall target is detected at step 312, then at step 318, the controller 102 changes the mapped status of this wall target 28 from active to inactive, and deenergize the associated illumination source of the wall target accordingly. If actuation of a red hazard panel is detected at step 314, then at step 320, the controller 102 decrements the current value of the status meter 32 by one life or health point. In response to this detected actuation of a red hazard panel, the controller checks at step 322 whether the value of the status meter is now zero, denoting loss of all lives or health points, in which case the controller 102 terminates the game session, denoting loss of the game by the participant(s). Otherwise, the game session continues.

At step 324, the controller checks whether all target panels and active wall targets have been actuated. So long as the controller 102 identifies at least one remaining active target panel or wall target 28 at step 324, the ongoing monitoring for timer expiration, floor and wall target actuation, and hazard panel actuation continues through repetition of steps 308 to 314. Once successful actuation of all floor and wall targets is confirmed at step 324, this can optionally be used to signify successful completion of the current round. However, in the illustrated embodiment, successful round completion is also conditional on arrival of all participants at an appropriate safe zone. Accordingly, with the countdown timer still running, the controller 102 checks at step 326 whether all participants are suitably positioned in one or more safe zones. In instances where the assigned task of the round includes travel to a designated destination zone 202, step 326 sees the controller 102 query all cells other than those of the designated destination zone 202 for the presence of participants, in which case this query includes the cells of the current round's designated start zone 200. If no participant detection signal is received from any queried cell, then the controller has positively determined that all participants must be located at the designated destination zone 202. This destination zone can then be treated as the starting zone of the next round, optionally with the starting zone of the just-completed round then being treated as the destination zone of the next round, though a different destination zone may alternatively be assigned, for example dictated by the mapping routine loaded for that next round. If a full-perimeter safe zone, or one or more generic safe zones, are used in instances where there are no designated start and destination zones, then all cells other than the safe zone(s) are queried at step 326.

If the controller finds at step 326 that not all participants are within an appropriate safe zone, then at step 328, the participants are alerted of this need to travel to an appropriate safe zone, for example by automated playback of verbal instruction over the loudspeaker 124. In the illustrated example, the process returns back to step 308 from step 328, meaning that the timer keeps running while waiting for the participants to reach an appropriate safe zone, and only once all participants are so located will the current round be concluded at step 326. In the illustrated embodiment, where scoring is purely timer based, this successful round completion does not trigger any accrual of scoring points to a running score tally. However, in other implementations employing such a tally, successful completion of the round may be correlated to awardal of a predetermined quantity of scoring points, the value of which being dictated by the game control software, in which case, upon positive round completion at step 326, such scoring points would be accrued to the running score tally maintained by the software during the gameplay session, and optionally updated in real-time on the score display 30.

In the illustrated embodiment, instead of accruing points, the controller checks at step 330 whether the entire batch of mapping routines for the current gameplay session have been completed. If there is at least one unexecuted mapping routine remaining among the current batch, then the controller 102 prepares for the next round by loading the next mapping routine of the current batch at step 322, which will govern the floor and wall target illumination pattern during that next round. The process then returns back to step 306 to initiate the next round with the newly loaded mapping routine, and repeats the subsequent steps 308 to 330 over again, either until the gameplay session is terminated by expiration of the timer at step 308 or reduction of the status meter level to zero at step 322, or until step 330 reveals that all of the batched mapping routines of the current session have been completed, thereby denoting that the participants have won the game. In the event of such a win, then final step 334 sees the controller award points to the scoring record(s) of the participant(s), at least partly based on the remaining value of the countdown timer.

In embodiments, with different user-selectable difficulty levels, instead of solely awarding a timer-based score, the awarded points at step 334 may be the sum of the remaining value of the countdown timer, plus a level-dependent bonus value that is proportional to the user-selected difficulty level. The bonus value may be the multiplication product of a fixed bonus factor and a numerical level identifier. In one example, where each difficulty level is identified by a respective integer value (Level 1, Level 2, Level 3), and the fixed bonus factor is 1000, the bonus value is therefore 1000 for Level 1, 2000 for Level 2, 3000 for Level 3, etc. By supplementing the timer-based score component with a bonus value proportional to the difficulty level, participants are more likely, or guaranteed, to achieve a greater overall score for completion of a harder level than an easier level, even if the harder level took longer to complete. So using this example, if the countdown timer counts in seconds, with each remaining second being worth one point at the end of the session, a participant who wins a Level 2 gameplay session with only 10-seconds left will earn 2010 points, while a participant who wins a Level 1 gameplay session with 60-seconds left will only earn 1060 points.

It will be appreciated that the countdown timer need not necessarily be measured in seconds. Also, the ratio between the timer value and timer-awarded point value may be varied from the forgoing 1:1 example, for example to adjust the relative weight ascribed to the difficulty level vs. the speed of completion. Ascribing a greater point value per second would afford greater weight to the speed of completion, whereby a participant completing a gameplay session at an excessively fast speed at a lower difficulty level would be able to achieve a more closely comparable score to another participant's slower completion of a harder difficulty level.

While the illustrated embodiment contemplates three software-controlled categories of floor panels (safe, targeted and hazard), it will be appreciated an alternative implementation may optionally omit the inclusion of the "safe" and/or "target" category and associated steps of the described methodology, without sacrificing the novelty and inventiveness of a system and method employing the computer-controlled and visually recognizable colour coding of hazard floor panels in a variety of different floor mapping routines. Likewise, the accompanying inclusion of wall-mounted or other more-elevated targets separate from the interactive floor may optionally be omitted without detriment to the patentability of the interactive floor construction and novel methods of interactive floor use, though the inclusion of such more-elevated targets is beneficial to introduce greater variety and challenge, where participants must remain visually aware of both ground-level hazards and targets for foot-based actuation, and additional elevated targets requiring hand-based or other upper body actuation.

It will also be appreciated that the particular gaming session described with relation to FIG. 15 is presented purely as a non-limiting example, and that the novel and inventive use of an interactive floor system to create a combination of tasked targets and penalized hazards, and the novel details of the unique floor assembly and cooper able room configuration, may be employed in variety of different interactive game implementations, whether alone or in combination with other game or amusement componentry.

Since various modifications can be made in my invention as herein above described, and many apparently widely different embodiments of same made, it is intended that all matter contained in the accompanying specification shall be interpreted as illustrative only and not in a limiting sense.

The invention claimed is:

1. An amusement system comprising:
   an interactive floor system comprising:
      an array of panels laid out in one or more grids with the panels of each grid lying at generally equal elevation in generally coplanar relation to one another to collectively define respective areas of an interactive floor surface;
      an illumination system operable to individually illuminate each panel of the array independently of any other panel of the array; and
      a sensing system operable to detect presence of any participant atop any panel of the array, independently of whether presence of a participant is detected on any other panel in the array;
      a controller connected to the illumination and sensing systems and configured to send illumination command signals to the illumination system to change illuminated statuses of the panels of the array, and to receive detection signals from the sensing system denoting detected presence of participants on the panels of the array;
      wherein the controller is configured to execute a gameplay sequence, and to execute the following steps therein:
         designate a subset of the panels as hazard panels to be avoided by participants;
         trigger illumination of the hazard panels by the illumination system in a manner distinguishable from all other panels of the array;
         monitor for detected participant presence on any of the hazard panels; and
         in response to detected participant presence on any hazard panel, perform at least one of (a) execution of a penalty step in said gameplay sequence, and (b) termination said gameplay sequence.

2. The amusement system of claim 1 wherein, for each panel, a respective rim of flexible material spans peripherally around the panel at peripheral regions of an upper face thereof.

3. The amusement system of claim 2 wherein the respective rim of flexible material spanning peripherally around the upper face of each panel at the peripheral regions thereof leaves exposed a unobstructed central region of said upper face of the panel where the panel is illuminable by said illumination system.

4. The system of claim 3 wherein each panel comprises transparent or translucent material through which light is emittable, and the illumination system comprises, for each panel, a respective illumination source positioned and operable to emit said light upwardly through the transparent or translucent material of the respective panel at the unobstructed central region thereof.

5. The amusement system of claim 2 wherein each panel comprises transparent or translucent material through which light is emittable, and the illumination system comprises, for each panel, cell, a respective illumination source positioned and operable to emit said light upwardly through the transparent or translucent material of the respective panel.

6. The amusement system of claim 1 wherein the one or more grids are installed in a floor space bound between two opposing walls in at least one direction, and said floor space is spanned in substantial entirety by said one or more grids in said direction between said two opposing walls, and said one or more grids are statically constrained by said two opposing walls.

7. The amusement system of claim 6 wherein the floor space is that of an enclosed room bound by a respective pair of opposing walls in each of two directions, said floor space being spanned in substantial entirety by said one or more grids in both of said two directions, and said one or more grids are statically constrained by said respective pairs of opposing walls.

8. The amusement system of claim 1 wherein the one or more grids reside in a substantially enclosed room having an interior space and an entrance by which participants are admissible thereto and a floor space of said room is spanned in substantial entirety by said one or more grids in at least a first direction measured between a first pair of opposing walls of said room.

9. The amusement system of claim 1 wherein the controller is further configured to, throughout the gameplay sequence, monitor for detected actuation by the participants of one or more targets, of which the participants are tasked with actuation to successfully complete said gameplay sequence.

10. The amusement system of claim 9 wherein said one or more targets comprise a second subset of one or more panels that are each designated as a target panel to be stepped on by said participants, and the controller is configured to trigger illumination of each target panel by the illumination system in a manner distinguishable from all other panels of the array, including the hazard panels; and to monitor for said actuation of the one or more targets, at least in part, by monitoring output from the sensing system for actuation of each target panel.

11. The amusement system of claim 10 wherein the controller is configured to designate a third subset of the panels as safe panels to which the participants are to travel after actuation of all designated targets to denote participant completion of the gameplay sequence, and to trigger illumination of each safe panel via the illumination system in a manner distinguishable from all other panels of the array, including the hazard and target panels.

12. The amusement system of claim 9 wherein the controller is configured to run a timer, and to terminate the gameplay sequence upon a first-occurring one of either expiration of the timer, or detected actuation of all targets that the participants have been tasked to actuate.

13. The amusement system of claim 1 wherein the controller is configured to, during said gameplay sequence, vary the subset of panels that are designated and distinctly illuminated as said hazard panels, and to accordingly vary which of the panels are monitored for detected participant presence.

14. The amusement system of claim 1 wherein the controller is configured to maintain a gameplay score tally and/or gameplay status meter, and to attribute a penalty thereto in response to detected participant presence on any of the hazard panels.

15. The amusement system of claim 14 comprising said gameplay status meter installed proximate the array of panels in a position readable therefrom by the participants interacting therewith.

16. The amusement system of claim 1 wherein the controller is configured to, in response to said detected participant presence on any hazard panel, execute said penalty step, and said penalty step comprises decrementing a status value.

17. The amusement system of 15 wherein the control is configured to, after executing said penalty step, check whether the status value is zero, and upon determination that said status value is zero, terminate the gameplay sequence.

18. The amusement system of claim 16 further comprising at least one performance display on which a status meter is displayed, and the controller is configured to update said status meter when the status value is decremented in the penalty step.

19. The amusement system of claim 18 wherein, during the gameplay sequence, a running countdown timer is also displayed on said at least one performance display, and the controller is configured to terminate the gameplay sequence on expiration of said running countdown timer.

20. The amusement system of claim 1 wherein the controller is configured to run a countdown timer, and to terminate the gameplay sequence on expiration of said timer.

* * * * *